June 4, 1940.　　　E. W. SEEGER ET AL　　　2,202,998
PHASE FAILURE AND OVERLOAD PROTECTIVE SYSTEM
Filed March 3, 1939
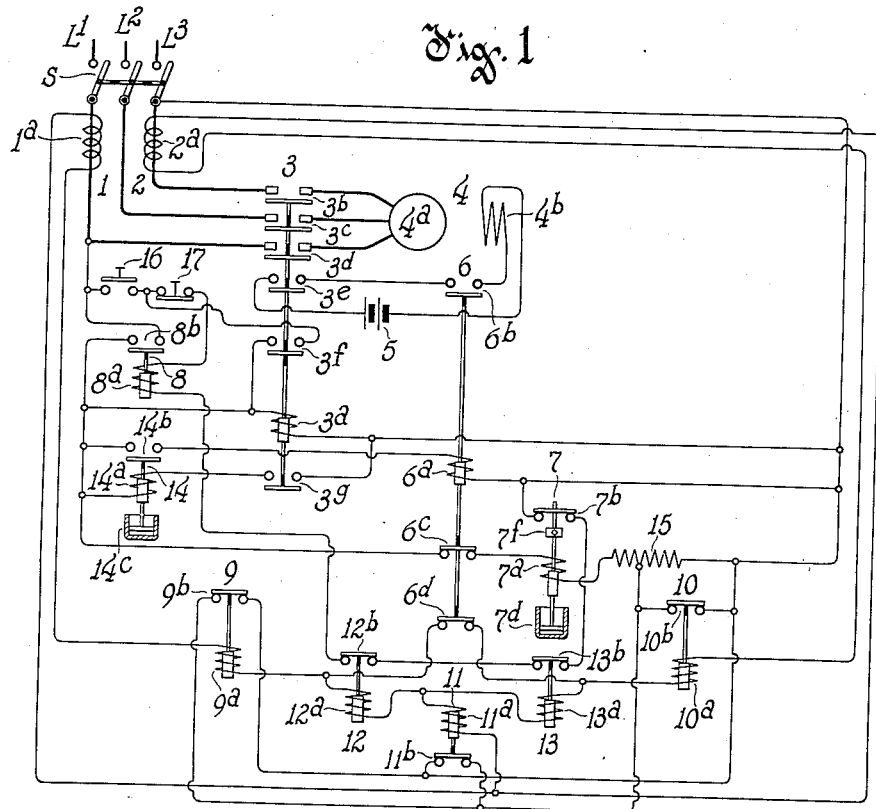
Fig. 1
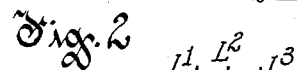
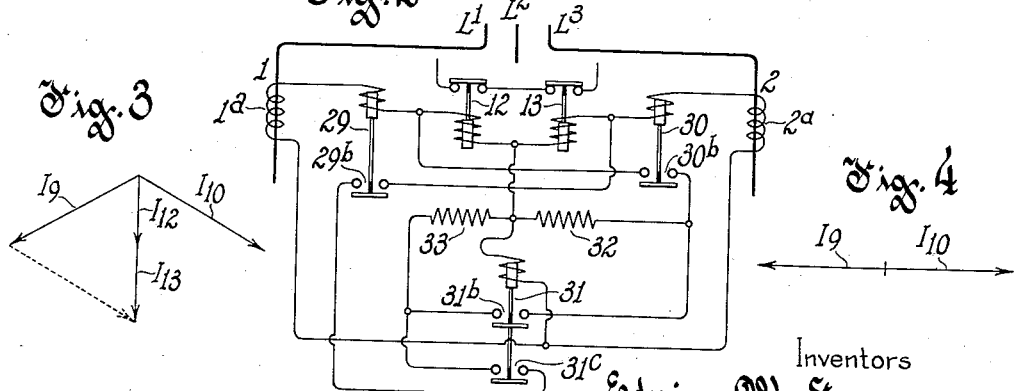
Fig. 2
Fig. 3
Fig. 4
Inventors
Edwin W. Seeger
Wendon C. Brown, Deceased
By Jean F. Brown
　　Administratrix
By　Frank W. Hubbard
　　Attorney Patented June 4, 1940

2,202,998

UNITED STATES PATENT OFFICE 2,202,998

PHASE FAILURE AND OVERLOAD PROTECTIVE SYSTEM

Edwin W. Seeger, Wauwatosa, Wis., and Glendon C. Brown, deceased, late of Wauwatosa, Wis., by Jean F. Brown, administratrix, Wauwatosa, Wis., assignors to Cutler-Hammer, Inc., Milwaukee, Wis., a corporation of Delaware Application March 3, 1939, Serial No. 259,672

7 Claims. (Cl. 172—289)

This invention relates to a phase failure and overload protective system, and, while not limited thereto, is particularly applicable for use in connection with polyphase dynamo-electric machines subject to starting currents greatly in excess of their normal running current and equipped with windings capable of carrying the starting current only for a limited time and also to the protection of translating devices against overloads of their windings incident to failure of current in one phase.

An object of the invention is to provide for disconnecting the power supply to a polyphase translating device, if the voltages between the various phases of the supply should become unbalanced, as for example, through phase failure.

Another object is to provide disconnecting means sensitive also to unbalanced currents where the current in any phase drops to a predetermined value.

Another object is to provide a controller of the aforementioned type for synchronous motors in which the motor primary is disconnected from the power supply if, upon starting the direct current exciting circuit is not completed within a given time.

Another object is to provide for selective current overload protection for the primary circuit of a synchronous motor depending upon whether the field circuit is energized or not.

Other objects and advantages will hereinafter appear.

The accompanying drawing illustrates several embodiments of the invention in connection with a three phase power supply system.

In the drawing,

Figure 1 shows the invention applied to a synchronous motor protective system.

Fig. 2 illustrates a modification of the system shown in Fig. 1 which is applicable to the protection of various polyphase translating devices, while Figs. 3 and 4 inclusive are diagrams of the currents in the systems under certain voltage conditions.

Referring to Fig. 1, a polyphase power supply system $L^1$, $L^2$, $L^3$ is adapted to supply power to a motor or other translating device through the line switch S. Connected in series with the lines $L^1$ and $L^3$ are the primary windings of current transformers 1 and 2, respectively, having secondary windings $1^a$ and $2^a$ respectively, which are connected to form a V, the voltages in the two branches being normally displaced 120°. A primary switch 3 is provided with an energizing winding $3^a$, normally open main contacts $3^b$, $3^c$ and $3^d$ and normally open auxiliary contacts $3^e$, $3^f$ and $3^g$. When the contacts $3^b$, $3^c$ and $3^d$ are closed they supply power to the primary winding $4^a$ of a synchronous motor 4 having a field winding $4^b$ and equipped with the usual secondary starting winding.

The system further includes a battery 5 or other source of direct current for supplying energy to the field winding $4^b$ of the motor. A field switch 6 having an energizing winding $6^a$ is provided with normally open main contacts $6^b$ which control the circuit of the winding $4^b$ and with normally closed auxiliary contacts $6^c$ and $6^d$. A timing relay 7 is provided with an energizing winding $7^a$ and normally closed contacts $7^b$. The armature of the relay is provided with an adjustable dashpot or other retarding means $7^d$ which provides for gradual movement thereof upon energization of the winding $7^a$. The movable member of the contact $7^b$ is loosely mounted on an extension of the magnet plunger and is actuated to open the contact $7^b$ upon abutment against a collar $7^f$ which is adjustably fixed to said extension. A relay 8 is provided with an energizing winding $8^a$ and normally open contacts $8^b$. The system further includes five current responsive relays 9 to 13 inclusive, having normally closed contacts $9^b$, $10^b$, $11^b$, $12^b$ and $13^b$ respectively, and energizing coils $9^a$, $10^a$, $11^a$, $12^a$ and $13^a$ respectively. Relays 9, 10 and 11 are so adjusted that they open their contacts, when normal starting current flows in their respective energizing coils, while relays 12 and 13 are overloads, the operation of which will be explained hereinafter. These relays are connected in a star system between the V-connected secondary windings of the transformers as illustrated in the drawing. A normally open push button switch 16 is provided for starting the equipment and a normally closed push button 17 for stopping. A relay 14 has an energizing winding $14^a$ and normally open contacts $14^b$. The relay 14 is also provided with an adjustable dashpot or other retarding device $14^c$.

The system shown in Fig. 1 is connected and operates as follows: If it is desired to start the equipment the switch S is closed. If now starting push button 16 is depressed a circuit is established from the line $L^1$ through push button 16, normally closed stop button 17, relay coil $8^a$, contacts $12^b$, $13^b$ and $7^b$ to line $L^3$. The relay 8 thereupon closes its normally open contact $8^b$ and current flows from line $L^1$ through contacts $8^b$, coil $3^a$ of the main switch 3 to line $L^3$.

Thereupon the main switch 3 closes and connects the primary winding of the motor 4 to lines L¹, L² and L³ through contacts 3ᵇ, 3ᶜ and 3ᵈ respectively. In closing the switch 3 also closes the normally open contacts 3ᵉ, 3ᶠ and 3ᵍ. The contact 3ᶠ parallels the push button contact 16, thus establishing a maintaining circuit for the coil 3ᵃ of the main switch whereupon the push button may be released. A circuit is also established from line L¹, through normally closed contacts 8ᵇ, 6ᶜ through relay coil 7ᵃ of the timing relay 7 through resistor 15 to line L³. A further circuit is closed from line L¹ over contacts 8ᵇ, coil 14ᵃ, contacts 3ᵍ to line L³. Thus the timing relays 7 and 14 are energized and their armatures are gradually raised at a slow rate against the action of the respective dashpots. After the expiration of a time sufficient to accelerate the motor 4 operating as an induction motor in the usual manner, the relay 14 closes the normally open contact 14ᵇ, thus energizing the relay coil 6ᵃ by a circuit extending from line L¹ through normally open contacts 8ᵇ and 14ᵇ, relay coil 6ᵃ to line L³. The switch 6 thereupon closes, thereby closing the exciting circuit of the field winding 4ᵇ from the battery 5 through normally open contacts 3ᵉ, normally open contacts 6ᵇ through winding 4ᵇ back to the battery 5. Upon closure, switch 6 opens contacts 6ᶜ, thus disconnecting relay coil 7ᵃ and returning it to its starting position. If for any reason the field switch 6 should not close the contacts 6ᵇ before the contacts 7ᵇ open, the coil 8ᵃ is deenergized, opening contact 8ᵇ and thereby deenergizing the main switch coil 3ᵃ and opening the primary current supply to the motor. The opening of the main switch also deenergizes the field relay 6, thereby opening the field circuit, whereupon the motor cannot be energized again until the push button switch 16 is operated. If it is desired at any time to disconnect the motor, the push button 17 is depressed which deenergizes relay 8 and returns the controller to the starting position. Also if the overloads 12 or 13 respond to open their respective contacts 12ᵇ and 13ᵇ, the relay 8 is deenergized and returns the controller to the starting position as aforedescribed.

It will be observed that during the starting period, as long as the field relay 6 is deenergized, the contacts 6ᵈ are closed, thereby connecting the two overload coils 12 and 13 in parallel so that the latter each carry only one-half of the secondary phase current of the transformers 1 and 2, as shown in Fig. 3 by the vectors I₁₂ and I₁₃, respectively. It will also be observed that the current in the energizing coils of each of the three relays 9, 10 and 11 is equal to the line or phase current flowing to the motor and the current in each overload coil 12 and 13 is one-half of the line current. With the contacts 6ᵈ closed the overload coils will therefore respond to a motor current which is twice that which flows therein with the contacts 6ᵈ open and thus the motor may draw the relatively heavy normal starting current without response of the overloads. If the normally closed contacts of relays 9, 10 and 11 are open, that is, if the motor current during starting exceeds a certain normal value for which the relays are adjusted, the whole resistor 15 is in circuit with the coil 7ᵃ so that the pull on the magnet coil 7ᵃ is relatively low and the time relay responds slower and therefore lengthens the time which may elapse between the closure of the push button 14 and the moment when the relay 8 disconnects the equipment. Hence if the starting current of the motor exceeds a certain value the permissible starting time is prolonged thereby avoiding premature disconnection of the motor.

After the energization of the field switch 6 the paralleling connection to the overload coils 12 and 13 is opened through opening of the contacts 6ᵈ and each overload coil carries the same current as the coils 9 and 10, respectively, that is, they carry the full line current. Thus after the field switch is closed the overloads respond to a lower current so as to disconnect the motor which then operates as a synchronous motor, if its current exceeds a certain value which normally is less than the allowable and/or necessary current during starting.

If an overload should occur during starting or running the overloads 12 and 13 open their normally closed contacts, thereby deenergizing the relay 8, which opens its maintaining circuit and causes disconnection of the motor as aforedescribed. If the starting is completed by the closure of the field switch 6, prior to the opening of contacts 7ᵇ the time relay 7 is again deenergized by opening of contact 6ᶜ, thereby returning the relay to the initial position.

As aforediscussed, as long as the currents in the three phases are equal the relays 9, 10 and 11 carry the same current I₉, I₁₀ and I₁₂ plus I₁₃, respectively, as shown in Fig. 3, which is equal to the line current of the motor. If, however, during the starting period the current in line L² should fail, the currents in lines L¹ and L² are displaced 180° as shown in Fig. 4 and the overload coils 12ᵃ and 13ᵃ are shunted by contacts 6ᵈ and no current flows through the overload coils 12ᵃ and 13ᵃ or the relay coil 11ᵃ. Hence the contacts of relay 11 close and short circuit parts of resistor 15, thus accelerating the operation of relay 7. If phase failure continues for a sufficient time, the relay 7 ultimately disconnects relay 8 and thus disconnects the motor from the line.

If no current flows in line L¹, the transformer 2 tends to send current through relay coil 9ᵃ and transformer winding 1ᵃ. Current flows through overloads 12 and 13 in parallel and hence through relay coil 11ᵃ. The current flowing in coil 9ᵃ is very small due to the high impedance of the winding 1ᵃ in series with the coil 9ᵃ. Thus said relay 9ᵃ closes its contacts to short circuit part of the resistor 15. If no current flows in line L³ the conditions are similar to those aforedescribed in connection with line L¹ and the motor will be disconnected in either case in the manner described in connection with current failure in line L².

Fig. 2 illustrates a system which is suitable for motors or other translating devices having a relatively high starting current, and for motors which may be thrown directly across the line upon starting such as synchronous or induction motors. The system comprises two current transformers 1 and 2 which are connected into the supply lines L¹ and L³ of a polyphase motor to supply current to overloads 12 and 13. The overload coils are connected in series with relays 29 and 30 respectively and form together with a relay 31 a start connected network supplied with current by the current transformers 1 and 2. The relays 29 and 30 are each provided with a normally open contact 29ᵇ and 30ᵇ respectively, while relay 31 is provided with two normally open contacts 31ᵇ and 31ᶜ. The system further includes two resistors 32 and 33 whose purpose will be explained hereafter. The overloads 12 and 13 are provided with normally closed contacts which may be connected in series with the actuating coil of a contactor (not shown) which supplies energy to a motor or other translating device to be protected.

The overloads are so calibrated, that they respond to a current which is only slightly in excess of the normal running current of the motor. During starting the current which passes through relays 29, 30 and 31 is sufficiently high to energize them to close their contacts. This connects resistor 32 in parallel with overload 12 and resistor 33 in parallel with overload 13, so that the latter receive only a part of the starting current and do not respond normally. Furthermore the overloads 12 and 13 are connected in parallel by contact 31c, so that each receives only one-half of the line current. This contact 31c may, however, be omitted if desired, in which case the overloads are only paralleled by the respective resistors.

The system illustrated in Fig. 2 affords phase failure protection during starting as follows: If line L¹ is without current, relay 29 is deenergized due to the high impedance of winding 1ª, so that overload 13 receives substantially the full line starting current of transformer 2, whereupon overload 13 responds to open its contacts and disconnects the motor. Similarly, if current fails in line L³ the relay 30 is deenergized, thereby sending a higher current through overload 12. If current fails in line L², the relay 31 is deenergized, which increases the current in overloads 12 and 13 due to the opening of their parallel connection at the contacts 31c. It is desirable, that the overloads 12 and 13 are provided with a delayed response such, that the relays 29, 30 and 31 close their contacts upon initial energization of the circuit, before the overloads 12 and 13 can respond to open their contacts.

What we claim as new and desire to secure by Letters Patent is:

1. In a three phase circuit, two current transformers having primary windings respectively connected in different phases of said circuit and having secondary windings forming a V-connection, the voltages of the two branches thereof being normally displaced 120°, three electromagnetic relays connected in a circuit forming a star between the terminals of said V-connection, current responsive overload relays in circuit with said secondary windings and said electromagnetic relays and means responsive to the operation of said electromagnetic relays to vary the response of said overload relays.

2. In a three phase circuit, two current transformers having primary windings respectively connected in different phases of said circuit and having secondary windings forming a V-connection, the voltages of the two branches thereof being normally displaced 120°, two current responsive overload relays having their operating windings connected in series, three electromagnetic relays, one of said electromagnetic relays being connected between the common terminal of said operating windings and the common terminal of said secondary windings, one each of the other electromagnetic relays being connected respectively between one free terminal of said operating windings and of said secondary windings, and means responsive to the operation of said electromagnetic relays to vary the response of said overload relays.

3. In a three phase circuit, two current transformers having primary windings respectively connected in different phases of said circuit and having secondary windings forming a V-connection, the voltages of the two branches thereof being normally displaced 120°, two current responsive overload relays having their operating windings connected in series, three electromagnetic relays, one of said electromagnetic relays being connected between the common terminal of said operating windings and the common terminal of said secondary windings, one each of the other electromagnetic relays being connected respectively between one free terminal of said operating windings and of said secondary windings, and switch means adapted to complete a direct connection between the free terminals of said operating windings in response to the operation of said electromagnetic relays.

4. In a three phase circuit, two current transformers having primary windings respectively connected in different phases of said circuit and having secondary windings forming a V-connection, the voltages of the two branches thereof being normally displaced 120°, two current responsive overload relays having their operating windings connected in series, three electromagnetic relays, one of said electromagnetic relays being connected between the common terminal of said operating windings and the common terminal of said secondary windings, one each of the other electromagnetic relays being connected respectively between one free terminal of said operating windings and of said secondary windings, an impedance for each overload relay and means responsive to the operation of said electromagnetic relays to connect said impedances in shunt with the respective overload relays.

5. In a three phase circuit, two current transformers having primary windings respectively connected in different phases of said circuit and having secondary windings forming a V-connection, the voltages of the two branches thereof being normally displaced 120°, two current responsive overload relays having their operating windings connected in series, three electromagnetic relays, one of said relays being connected between the common terminal of said operating windings and the common terminal of said secondary windings, one each of the other electromagnetic relays being connected respectively between one free terminal of said operating windings and of said secondary windings, an impedance for each overload relay, and switch means adapted to connect said impedances between the free terminals of said operating windings in response to the operation of said electromagnetic relays.

6. In a controller for a polyphase synchronous motor having a primary and a field winding, an electromagnetic main switch for connecting said primary winding to a source of supply, an electromagnetic field switch for controlling the energization of said field winding, means for controlling said switches, two current transformers having their primary windings connected in different phases of said primary circuit and their secondary windings arranged in V-connection, the voltages of the two branches thereof being normally displaced 120°, three electromagnetic relays connected in a circuit forming a star between the terminals of said V-connection, current responsive overload relays in circuit with said secondary windings and adapted to control said main switch, and timing means responsive to the operation of said electromagnetic relays and said field switch and adapted to control said first mentioned means.

7. In a controller for a polyphase synchronous motor having a primary and a field winding, an electromagnetic main switch for connecting said primary winding to a source of supply, an electromagnetic field switch for controlling the energization of said field winding, means for controlling said switches, two current transformers having their primary windings connected in different phases of said primary circuit and their secondary windings arranged in V-connection, the voltages of the two branches thereof being normally displaced 120°, three electromagnetic relays connected in a circuit forming a star between the terminals of said V-connection, current responsive overload relays in circuit with said secondary windings and adapted to control said main switch, and means responsive to the operation of said electromagnetic relays to vary the response of said overload relays.

EDWIN W. SEEGER.
JEAN F. BROWN,
*Administratrix of the Estate of Glendon C. Brown, Deceased.*